(12) United States Patent
Ona et al.

(10) Patent No.: US 6,416,557 B1
(45) Date of Patent: Jul. 9, 2002

(54) WATER BASED FIBER TREATMENT AGENT

(75) Inventors: Isao Ona; Hiroki Ishikawa; Tsutomu Naganawa; Kazuo Kobayashi; Yoshitsugu Morita, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/396,258

(22) Filed: Sep. 15, 1999

(30) Foreign Application Priority Data

Sep. 25, 1998 (JP) .......................... 10-270753

(51) Int. Cl.$^7$ .......................... D06Q 1/02; D06M 11/00
(52) U.S. Cl. .................. 8/115.5; 8/115.51; 8/115.7; 8/116.1; 8/115.6; 252/312; 106/287.14; 106/287.1
(58) Field of Search .............................. 8/115.6, 115.51, 8/115.7, 116.1, 115.5; 106/287.14, 287.1

(56) References Cited

U.S. PATENT DOCUMENTS

| | | | | | |
|---|---|---|---|---|---|
| 4,052,331 A | * | 10/1977 | Dumoulin | ................... | 252/312 |
| 4,620,878 A | * | 11/1986 | Gee | ....................... | 106/287.15 |
| 4,784,665 A | * | 11/1988 | Ona et al. | ................... | 8/115.8 |
| 4,980,167 A | | 12/1990 | Harashima et al. | ......... | 424/401 |
| 5,760,109 A | * | 6/1998 | Inokuchi et al. | ............ | 523/414 |
| 5,871,761 A | | 2/1999 | Kuwata et al. | ............. | 424/401 |
| 5,928,660 A | * | 7/1999 | Kobayashi et al. | ......... | 424/401 |

* cited by examiner

Primary Examiner—Mark Kopec
Assistant Examiner—D G Hamlin
(74) Attorney, Agent, or Firm—Richard I. Gearhart; Jim L. De Cesare

(57) ABSTRACT

The present invention relates to a water-based fiber treatment agent that has the ability to equip fibers with such properties as an excellent smoothness and lubricity, a reduced tack, and an appropriate or moderate slickness.

2 Claims, No Drawings

WATER BASED FIBER TREATMENT AGENT

FIELD OF THE INVENTION

The present invention relates to a water-based fiber treatment agent. More particularly, the present invention relates to a water-based fiber treatment agent that can equip fibers with such properties as an excellent smoothness and lubricity, a reduced tack, and an appropriate slickness.

BACKGROUND OF THE INVENTION

Silicone oils are characterized by an excellent heat resistance, excellent water repellency, and excellent smoothness and as a consequence are used as lubricants for unprocessed yarns and raw cotton, as spinning lubricants, as softness finishing agents for knitted and woven fabrics, and as color-deepening agents for polyester fiber woven fabrics. As examples in this regard, polydimethylsiloxanes are used as fiber treatment agents that impart smoothness and lubricity to fibers while amino-functional polyorganosiloxanes are used as fiber treatment agents that impart a slick feel to fibers.

The preceding notwithstanding, various problems have been associated with the use of the above-described fiber treatment agents. Thus, fiber treatment agents comprising polydimethylsiloxane are unable to equip fibers with a satisfactory smoothness, lubricity, or resistance to adhesion. Fiber treatment agents comprising amino-functional polyorganosiloxane cause fibers to have a very slick feel and are unable to improve the handle so as to provide an excellent softness while exhibiting a dry sensation. Moreover, while amino-functional polyorganosiloxane is used as a color-deepening treatment agent for, for example, the georgette fabric (dyed black) produced from strongly twisted polyester filament yarn, it also causes the fiber to have a very slick feel and ultimately causes a deterioration in the sense of dryness to the touch.

An object of the present invention is to provide a water-based fiber treatment agent that has the ability to equip fibers with such properties as an excellent smoothness and lubricity, a reduced tack, and an appropriate or moderate slickness.

DETAILED DESCRIPTION OF THE INVENTION

The present invention relates to a water-based fiber treatment agent comprising
(A) about 100 weight parts silicone oil,
(B) about 5 to 200 weight parts silicone rubber powder with an average particle size of 0.1 to 500 μm, and
(C) a freely selected amount of water.

The water-based fiber treatment agent according to the present invention will be explained in detail hereinbelow.

The water-based fiber treatment agent according to the present invention comprises (A) silicone oil, (B) silicone rubber powder with an average particle size of 0.1 to 500 μm, and (C) water. The silicone oils typically employed for fiber treatment agents can be used as component (A), but otherwise the viscosity, molecular structure, and silicon-bonded groups in component (A) are not critical. Component (A) preferably has a viscosity of 10 to 100,000 mPa·s at 25° C. and a straight-chain or partially branched straight-chain molecular structure. The degree of polymerization of this component is not critical, but preferably is in the range from 2 to 2,000. This component has a degree of polymerization preferably from 2 to 100 when the treatment agent will be used as a lubricant and preferably from 100 to 2,000 when the treatment agent will be used for the purpose of improving the handle. Component (A) can be hydrophilic or hydrophobic. When (A) is hydrophilic, an emulsifying agent can be used on an optional basis to effect dispersion of (A) in the water; when (A) is water-soluble there is no absolute requirement for use of an emulsifying agent; and when (A) is hydrophobic the use of an emulsifying agent is preferred in order to effect a highly stable dispersion of (A) in water.

Component (A) can be exemplified by trimethylsiloxy-endblocked polydimethylsiloxane such as

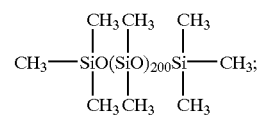

and silanol-endblocked polydimethylsiloxane such as

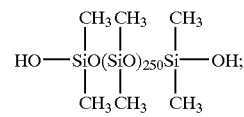

by silicone oils as afforded by replacing all or part of the methyl in the preceding polydimethylsiloxanes with non-methyl alkyl such as ethyl, propyl, butyl, pentyl, hexyl, heptyl, octyl, decyl, or dodecyl; alkenyl such as vinyl, allyl, or hexenyl; cycloalkyl such as cyclopentyl or cyclohexyl; or aryl such as phenyl, tolyl, or naphthyl; for example, dimethylsiloxane-methylphenylsiloxane copolymer such as

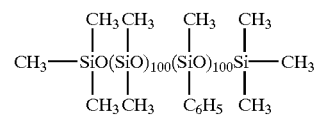

and dimethylsiloxane-methylvinylsiloxane copolymer such as

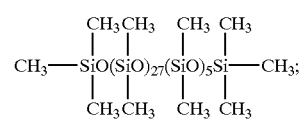

by silicone oils as afforded by replacing part of the methyl in the preceding polydimethylsiloxanes with the hydrogen atom, for example, polymethylhydrogensiloxane such as

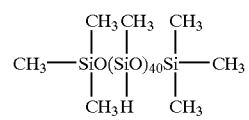

and by silicone oils as afforded by replacing part of the methyl in the preceding polydimethylsiloxanes with alkoxy such as methoxy, ethoxy, or propoxy; haloalkyl such as 3,3,3-trifluoropropyl; an amino-functional organic group such as 3-aminopropyl, N-(2-aminoethyl)-3-aminopropyl, or N-cyclohexyl-3-aminopropyl; an epoxy-functional organic group such as 3-glycidoxypropyl or 2-(3,4-epoxycyclohexyl)ethyl; a mercapto group such as 3-mercaptopropyl; an acrylic-functional organic group such as 3-methacryloxypropyl; the carboxyl group; the amide group; or a polyether group; for example, silicone oils such as

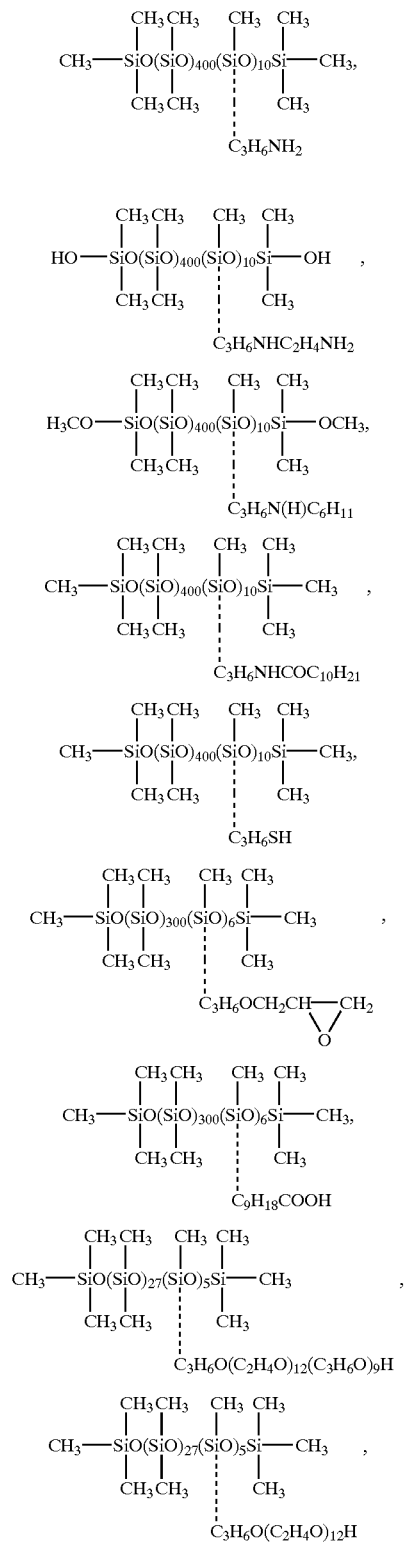

-continued

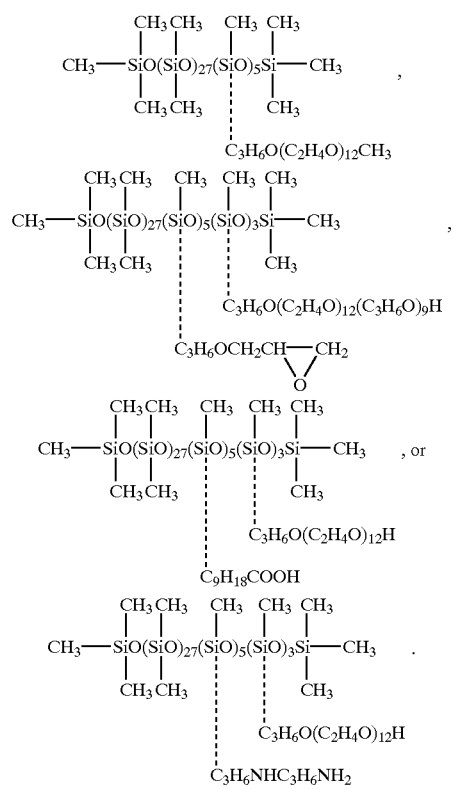

The silicone rubber powder used as component (B) functions to impart smoothness and lubricity to fibers and to reduce their tack. Neither of these functions can be satisfactorily fulfilled by a water-based fiber treatment agent composed of only component (A) and water. And, in the particular case of use of an amino-functional polyorganosiloxane as the silicone oil, component (B) imparts an appropriate or acceptable slickness to the fiber. The average particle size of component (B) should be in the range from 0.1 to 500 μm. The preferred range for the average particle size is 0.5 to 50 μm because this range provides the instant treatment agent with a particularly good blending stability, dilution stability, and shear stability. With regard to shape, component (B) can be spherical, disk-like, or irregular in shape with a spherical shape being preferred.

Component (B) is preferably silicone rubber powder as produced by curing a silicone rubber composition while the composition is dispersed in a microparticulate state in water. The silicone rubber composition used for this purpose can be exemplified by addition-curing silicone rubber compositions, condensation-curing silicone rubber compositions, organoperoxide-curing silicone rubber compositions, and ultraviolet-curing silicone rubber compositions. In a particularly preferred embodiment, component (B) is produced by the cure of a silicone rubber composition while the composition is emulsified in water using an emulsifying agent. In an even more preferred embodiment, component (B) is produced by the cure of an addition-curing silicone rubber composition or a condensation-curing silicone rubber composition while the composition is emulsified in water using an emulsifying agent. The addition-curing silicone rubber compositions can be exemplified by compositions comprising organopolysiloxane bearing at least 2 alkenyl groups in each molecule, organopolysiloxane bearing at least 2 silicon-bonded hydrogen atoms in each molecule, and platinum catalyst. The condensation-curing silicone rubber compositions can be exemplified by compositions comprising organopolysiloxane bearing at least 2 silicon-bonded hydroxyl groups or hydrolyzable groups (e.g., alkoxy, oxime, acetoxy, or aminoxy) in each molecule, silane crosslinker bearing at least 3 hydrolyzable groups (e.g., alkoxy, oxime, acetoxy, or aminoxy) on the silicon atom in each molecule, and a condensation catalyst such as an organotin compound or an organotitanium compound. Additional improvements in fiber smoothness and lubricity can be had through the use of a water-based fiber treatment agent that employs silicone rubber powder prepared from the blend of noncrosslinking oil with a silicone rubber composition as described above. This noncrosslinking oil is an oil that is simply present in the silicone rubber powder in a form that can spontaneously bleed from the powder or can be extracted therefrom by organic solvent. Oils of this type can be exemplified by noncrosslinking silicone oils and noncrosslinking organic oils. Noncrosslinking silicone oils are silicone oils that do not participate in the curing reaction that forms the silicone rubber powder and can be specifically exemplified by nonreactive silicone oils such as trimethylsiloxy-endblocked dimethylpolysiloxanes, trimethylsiloxy-endblocked dimethylsiloxane-methylphenylsiloxane copolymers, and trimethylsiloxy-endblocked dimethylsiloxane-methyl(3,3,3-trifluoropropyl)siloxane copolymers.

Component (B) is added to the treatment agent under consideration generally at from 5 to 200 weight parts, preferably at from 5 to 150 weight parts, more preferably at from 5 to 100 weight parts, and particularly preferably at from 10 to 100 weight parts, in each case per 100 weight parts component (A). When component (B) is used in an amount below the specified lower limit, the corresponding water-based treatment agent will be unable to satisfactorily improve fiber smoothness and lubricity or lower the tack, or prevent the tendency for a strong slickness to appear. Use of component (B) in an amount exceeding the specified upper limit is associated with a variety of problems. For example, when such a water-based treatment agent is used as a yarn lubricant, component (B) will accumulate as a scummy residue on the yarn guides. In another context, whitening phenomena (pale white color) tend to be produced when such a water-based treatment agent is used as a color-deepening agent for polyester fabrics.

The treatment agent according to the present invention comprises component (A), component (B), and water. The use of an emulsifying agent is not absolutely required when component (A) is hydrophilic, but is preferred in order to effect the stable dispersion of component (B) in water. When component (A) is hydrophobic, the use of emulsifying agent is preferred in order to effect the stable dispersion of both components (A) and (B) in water. The subject emulsifying agents can be exemplified by cationic emulsifying agents, nonionic emulsifying agents, and anionic emulsifying agents with nonionic emulsifying agents being preferred. The cationic emulsifying agents can be specifically exemplified by quaternary ammonium hydroxides and their salts such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, beef tallow trimethylammonium hydroxide, and cocotrimethylammonium hydroxide. The nonionic emulsifying agents can be exemplified by polyoxyalkylene alkyl ethers, polyoxyalkylene alkylphenyl ethers, polyoxyalkylene alkyl esters, polyoxyalkylenealkylsorbitan alkyl esters, polyethylene glycol, polypropylene glycol, and diethylene glycol. The anionic emulsifying agents can be exemplified by alkylbenzenesulfonates, alkylsulfonates, the salts of alkyl sulfate esters, the salts of the sulfate esters of polyoxyalkylene alkyl ethers, the salts of the sulfate esters of polyoxyalkylene alkylphenyl ethers, and the salts of alkyl fatty acids.

The emulsifying agent is preferably used at from 5 to 100 weight parts for each 100 weight parts of the total of components (A) and (B). The water may be used in any amount and its quantity of addition is thus not critical. However, when viewed from the standpoint of the efficiency of fiber treatment, the water is preferably used at from 50 to 400 weight parts for each 100 weight parts of the total of components (A) and (B).

The dispersion of component (A) in water can as a general matter be formed using, for example, a stirrer, homomixer, line mixer, colloid mill, or homogenizer. An emulsifying agent and particularly a nonionic emulsifying agent as described above is preferably used during this step in order to improve the stability of component (A) in water. A polyorganosiloxane (A) that contains about 2 mole % amino-functional organic group or carboxy-functional organic group in the molecule can be dispersed in water as liquid droplets with an average particle size of 0.01 to 0.1 $\mu$m using only an ordinary stirrer and without the use of a special emulsifying device. The use of an emulsifying device such as a colloid mill or homogenizer is preferred with other organopolysiloxanes, and in these cases the average particle size of the liquid droplets will generally be from 2 to 10 $\mu$m. The average particle size produced by dispersing a cyclic diorganosiloxane in water with an emulsifying device such as an homogenizer and then polymerizing the cyclic diorganosiloxane will ordinarily be from 0.2 to 5 $\mu$m.

The mechanical dispersion of component (B) in water can, for example, be used to effect dispersion of the silicone rubber powder (B) in water. However, the dispersion of component (B) is preferably produced by curing a silicone rubber composition, e.g., an addition-curing, condensation-curing, organoperoxide-curing, or UV-curing silicone rubber composition, while the composition is dispersed in a microparticulate state in water. A particularly preferred method for effecting the dispersion of (B) in water comprises curing the silicone rubber composition while it is emulsified in water in the presence of an emulsifying agent. The treatment agent according to the present invention is preferably prepared by intermixing a water-based dispersion of component (A) with a water-based dispersion of component (B) and particularly a water-based dispersion of component (B) as afforded by curing a silicone rubber composition while the composition is emulsified in water in the presence of an emulsifying agent. In order to improve the stability of component (B) in water, the water-based dispersion of component (B) is preferably produced using an emulsifying agent as described above and in particular using a nonionic emulsifying agent.

Other components can be admixed into the treatment agent according to the present invention on an optional basis, for example, antistatics, charge-controlling agents, preservatives, and rust inhibitors. In addition, component (A) can be crosslinked and the treatment efficiency with the subject treatment agent can be improved by the admixture of a tin condensation catalyst, e.g., dibutyltin diacetate or dibutyltin dilaurate, or a zinc- or zirconium-based condensation catalyst.

The treatment agent according to the present invention can be used on, for example, regenerated fibers such as rayon, semisynthetic fibers such as acetate; and synthetic fibers such as nylon, polyester, and acrylic fibers. This treatment agent can be used to impart smoothness and lubricity to such fibers. For example, it can be used as a lubricant for raw yarn and raw cotton, as a treatment agent for cotton wadding, as a lubricant for the nylon staple fiber for mixture with wool, as a lubricant for acrylic staple fiber, as a knitting lubricant, as a spinning lubricant, and as a lubricant for machine thread (elastic urethane yarn). When component (A) is silicone oil containing amino-, epoxy-, amide-, or carboxyl-functional organic groups, the treatment agent can be used as a fabric finishing agent. In specific terms, a treatment agent of this type can be used as a napping agent for napped fabrics; as an agent for improving the handle, i.e., for improving the softness, smoothness, compression recovery, wrinkle resistance, and stretch/recovery performance; as a treatment agent for deepening the color (increasing the depth of color) of polyester fabrics; as a dissolution-resistant treatment agent for sportswear and the like; and as a waterproofing agent. Moreover, use of a silicone oil (A) containing polyether-functional organic groups produces a water-based fiber treatment agent that is self-emulsifying even without the admixture therein of an emulsifying agent as described above.

The subject treatment agent can be uniformly adhered, either neat or from its aqueous dilution, on the fabric, yarn, cotton, tow, or top using such coating techniques as spraying, kiss roll coating, or gravure coating. Application is then followed by drying and heat treatment. The treatment agent add-on will generally be from 0.1 to 8 weight % calculated on fiber. Considered on a case-by-case basis, the add-on is generally preferably from 0.2 to 1.0 weight % in the case of raw cotton or raw yarn of polyester, nylon, etc., and preferably from 0.3 to 1.0 weight % when the objective is to improve the handle of knits and weaves that use cotton or polyester/cotton mixed yarn.

The water-based fiber treatment agent according to the present invention will now be explained in greater detail using working examples. The viscosity values reported in the examples were measured at 25° C.

Reference Example 1

A silicone rubber composition was prepared by mixing the following to homogeneity: 96 weight parts dimethylvinylsiloxy-endblocked polydimethylsiloxane (viscosity=400 mPa·s), 4 weight parts trimethylsiloxy-endblocked polymethylhydrogensiloxane (viscosity=20 mPa·s), 6 weight parts trimethylsiloxy-endblocked polydimethylsiloxane (viscosity=20 mPa·s), and isopropanolic chloroplatinic acid solution in an amount sufficient for the solution to provide 20 weight-ppm platinum metal calculated on the dimethylvinylsiloxy-endblocked polydimethylsiloxane. Curing this silicone rubber composition by holding for 1 day at room temperature gave a silicone rubber with a durometer of 28.

This silicone rubber composition was then emulsified in its entirety using 53 weight parts of a 3 weight % aqueous solution of polyoxyethylene nonylphenyl ether (HLB=13.1). This was followed by the addition of 50 weight parts water to afford an aqueous dispersion of the silicone rubber composition. The silicone rubber composition dispersed in the water was then cured by holding the aqueous dispersion for 1 day at room temperature to produce a water-based dispersion of silicone rubber powder (silicone rubber powder content=60 weight %). The silicone rubber powder in this water-based dispersion was spherical and had an average particle size of 4 μm.

Reference Example 2

158.5 g water, 15 g hexadecyltrimethylammonium chloride, and 150.0 g methyltrimethoxysilane were placed in a 500-mL beaker, mixed to homogeneity, and then converted into a water-based dispersion by a single pass of the mixture through an homogenizer at a pressure of 300 kgf/cm². 152.7 g water, 10 g hexadecyltrimethylammonium chloride, and 0.8 g sodium hydroxide were subsequently introduced into a 500-mL four-neck flask fitted with a stirrer, reflux condenser, addition funnel, and thermometer and were gradually heated to 85° C. while stirring. At this point the already prepared water-based dispersion was gradually added dropwise over 90 minutes from the addition funnel. After the completion of addition, hydrolysis of the methyltrimethoxysilane and condensation were carried out over 30 minutes at 85° C. The reaction was followed by the addition of 1.2 g acetic acid to produce the water-based dispersion of a polymethylsilsesquioxane powder (PMS powder) with the average unit formula $(CH_3SiO_{3/2})$ and an average particle size of 0.05 μm.

EXAMPLE 1

A preliminary mixture was prepared from 30 weight parts amino-functional polyoganosiloxane (viscosity=2,500 mPa·s) with the average formula

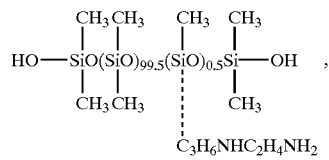

3.5 weight parts polyoxyethylene (6 mol adduct) lauryl ether, and 4.0 weight parts water and this preliminary mixture was emulsified using a colloid mill emulsifier. The admixture of 62 weight parts water and 0.5 weight part acetic acid then gave the finished water-based dispersion of the amino-functional polyorganosiloxane (amino-functional polyorganosiloxane content=30 weight %). This water-based polyorganosiloxane dispersion and the water-based silicone rubber powder dispersion produced in Reference Example 1 were mixed in the proportions given in Table 1. The water-based fiber treatment agent was then prepared by dilution with water so as to bring the total content of the polyorganosiloxane and silicone rubber powder in the mixture to 1 weight %.

In order to investigate the color-deepening activity for black-dyed polyester fabric, fabric for women's summer formal wear (made from strongly twisted polyester filament yarn, dyed black with a black disperse dye) was cut into 20 cm×20 cm samples. 300 mL of the above-described fiber treatment agent was introduced into a 500-mL beaker and the fabric was immersed in the fiber treatment agent for 20 seconds. The fabric was then wrung out to an expression ratio of 100% using a mangle roll, hung overnight in a 25° C. room to dry, and then heated for 2 minutes in a 150° C. oven. The activity as a color-deepening agent was subsequently evaluated as follows.

Lightness Measurement (L value)

The lightness (L value) was measured on a stack of two sheets of the fabric using a color difference instrument. In addition, the sample was laid on white paper in order to evaluate the color-deepening effect visually.

Handle (Slickness, Smoothness, Softness)

The handle was evaluated by manual manipulation.
++: very good
+: good
Δ: unsatisfactory
x: poor In one series of comparative examples, treatment agents were prepared in the proportions reported in Table 1 and were submitted to evaluation as above. In another comparative example, the same procedures and tests as above were used, with the exception that the water-based PMS powder dispersion prepared in Reference Example 2 was used in place of the water-based silicone rubber powder dispersion prepared in Reference Example 1. As the results in Table 1 show, the water-based fiber treatment agents according to the present invention had a higher color-deepening performance for georgette fabric for women's summer formal wear while imparting an appropriate slickness to this fabric and also imparting thereto an excellent smoothness. These results demonstrate that the fiber treatment agent according to the present invention is highly suitable as a color-deepening agent.

TABLE 1

| Silicone oil: silicone rubber powder mixing ratio | visual lightness (L value) | evaluation of color-deepening performance | handle | overall evaluation |
|---|---|---|---|---|
| examples of the invention | | | | |
| 85:15 | 11.86 | good, deep black | the slickness and smoothness were both very good | very good |
| 75:25 | 12.25 | good, deep black | the slickness and smoothness were both very good | very good |
| 55:45 | 12.20 | good, deep black | the slickness and smoothness were both very good | very good |
| comparative examples | | | | |
| blank (water only) | 14.11 | bluish black, unsatisfactory | coarse handle | unsatisfactory |
| 100:0 | 12.44 | good, deep black | overly slick | unsatisfactory, very slick |
| 25:75 | 14.41 | slightly whitened | handle slightly too stiff | poor |
| 0:100 | 15.05 | whitened | good slipperiness for fabric surface, handle overly stiff | poor |
| silicone oil PMS powder mixing ratio = 55:45 | 12.22 | good, deep black | fairly stiff handle | poor |

EXAMPLE 2

150 weight parts amino-functional polyorganosiloxane (viscosity=1,300 mPa·s) with the formula

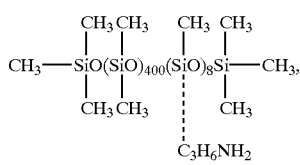

20 weight parts polyoxyethylene (6 mol adduct) lauryl ether, 30 weight parts polyoxyethylene (8 mol adduct) lauryl ether, 0.5 weight part acetic acid, and 797.5 weight parts water (the water was added in three portions) were emulsified in a mixer to give the water-based dispersion of the amino-functional polyorganosiloxane (amino-functional polyorganosiloxane content=15 weight %). This water-based polyorganosiloxane dispersion was mixed with the water-based silicone rubber powder dispersion prepared in Reference Example 1 in the proportions reported in Table 2. The water-based fiber treatment agent was then prepared by dilution with water so as to bring the total content of the polyorganosiloxane and silicone rubber powder in the mixture to 1 weight %.

100% cotton knit fabric for tee-shirts was cut into 30 cm×30 cm samples and immersed in the fiber treatment agent for 20 seconds. The fabric was then wrung out to an expression ratio of 100% using a mangle roll, hung overnight in a 25° C. room to dry, subsequently heated for 3 minutes in a 130° C. oven, and finally held in a 25° C. room for 3 days. The handle of the fabric was then examined by manual manipulation. The stretch/recovery behavior was also examined manually by grasping two edges of the knit with the hands, stretching about 50%, and releasing the tension. Treatment agents were also prepared as reported in Table 2 to serve as comparative examples and these comparative treatment agents were evaluated by the same procedures as above. The results reported in Table 2 confirm that water-based fiber treatment agents according to the present invention can impart a very good handle, do not produce an overly slick feel, and can impart a very good stretch/recovery behavior (fittability) and are thus highly qualified for application as handle improvers.

TABLE 2

| silicone oil: silicone rubber powder mixing ratio | handle | stretch/recovery behavior | overall evaluation |
|---|---|---|---|
| examples of the invention | | | |
| 80:20 | not too slick, soft and comfortable, good recovery from compression, very good handle | smooth stretch and recovery, very good stretch/recovery behavior | very good |
| 60:40 | not too slick, soft and comfortable, good recovery from compression, very good handle | smooth stretch and recovery, very good stretch/recovery behavior | very good |
| comparative examples | | | |
| blank (water only) | stiff lacked soft feel | poor stretch/recovery behavior | poor |
| 100:0 | very soft and flexible, but with an overly strong sensation of slickness | good stretch/recovery behavior | poor, very slick |
| 0:100 | stiff, lacked soft feel; surface exhibited fairly high slipperiness | poor stretch/recovery behavior | coarse handle, poor |

EXAMPLE 3

400 weight parts trimethylsiloxy-endblocked polydimethylsiloxane (viscosity=350 mPa·s, degree of polymerization=130), 20 weight parts polyoxyethylene (5 mol adduct) lauryl ether, 10 weight parts polyoxyethylene (8.5 mol adduct) nonylphenyl ether, 5 weight parts sodium polyoxyethylene (4 mol adduct) nonylphenyl ether sulfonate, and 565 weight parts water were first mixed and were then emulsified in a colloid mill emulsifier to yield a water-based dispersion of the polydimethylsiloxane (polydimethylsiloxane content=40 weight %). This water-based polydimethylsiloxane dispersion was mixed with the water-based silicone rubber powder dispersion prepared in Reference Example 1 in the proportion reported in Table 3. The water-based fiber treatment agent was then prepared by dilution with water so as to bring the total content of the polydimethylsiloxane and silicone rubber powder in the mixture to 5 weight %.

This fiber treatment agent was uniformly applied to a 5 weight % pick up (calculated on the yarn) on raw machine yarn (100% polyester spun yarn). The dynamic friction coefficient $\mu$ was then measured on this treated yarn using the following conditions and an instrument for measuring the dynamic friction coefficient of yarns.

sample length: 20 cm yarn velocity (m/minute): 1.0 and 6.0 drum material: stainless steel

Treatment agents were also prepared as reported in Table 3 to serve as comparative examples and these comparative treatment agents were evaluated by the same procedures as above. The results reported in Table 3 confirm that water-based fiber treatment agents according to the present invention can impart a uniform running behavior to machine yarn made of 100% polyester fiber spun yarn and can produce a substantial decline in the dynamic friction coefficient $\mu$ and are thus highly qualified for application as lubricants for machine yarns.

TABLE 3

| silicone oil: silicone rubber powder mixing ratio | dynamic friction coefficient $\mu$ | | | |
|---|---|---|---|---|
| | yarn velocity = 1 m/minute | yarn velocity = 6 m/minute | yarn running behavior | overall evaluation |
| invention example | | | | |
| 80:20 | 0.128 | 0.148 | uniform yarn running behavior | good |
| comparative examples | | | | |
| 100:0 | 0.225 | 0.240 | somewhat nonuniform yarn running behavior | moderately poor |
| 0:100 | 0.242 | 0.268 | scum tended to be produced | poor |
| blank (water only) | 0.282 | 0.377 | very poor | — |

EXAMPLE 4

400 weight parts trimethylsiloxy-endblocked polydimethylsiloxane (viscosity=200 mPa·s, degree of polymerization=110), 20 weight parts polyoxyethylene (5 mol adduct) lauryl ether, 10 weight parts polyoxyethylene (8.5 mol adduct) nonylphenyl ether, 5 weight parts sodium polyoxyethylene (4 mol adduct) nonylphenyl ether sulfonate, and 565 weight parts water were first mixed, then emulsified in a colloid mill emulsifier, and then, in order to obtain additional improvements in the stability, treated once with an homogenizer emulsifier at 400 kgf/m$^2$ to yield a water-based dispersion of the polydimethylsiloxane (polydimethylsiloxane content=40 weight %). This water-based polydimethylsiloxane dispersion was mixed with the water-based silicone rubber powder dispersion prepared in Reference Example 1 in the proportion reported in Table 4 to produce a lubricant for use with Spandex®. This lubricant was applied at a pick up of 7.0 weight % (calculated on the yarn) to a commercial fiber (urethane fiber) yarn and the yarn was then wound up in skein form from the cone. This was followed by immersion for 30 minutes in ethanol : toluene mixed solvent (weight ratio=4:1) using 100-times as much solvent (weight basis) as yarn in order to remove the raw yarn lubricant. This immersion was followed by drying. The lubricant-free yarn treated in this manner was then wound in a flat and even manner around clean aluminum plates (50 mm×50 mm×2 mm) under a tension of 0.1 g/D. Two of these yarn-loaded aluminum plates were stacked one on top of the other, a 500 g weight was placed on top of this stack, and the entire assembly was held in an oven at 80° C. for 10 days. After removal from the oven, the surface-to-surface adhesion was evaluated when the 2 plates were unstacked. The 100-meter wound up skein was also subjected to repeated cycles of stretch/recovery in order to evaluate lubricant adhesion. Treatment agents were also prepared as reported in Table 4 to serve as comparative examples and these comparative treatment agents were evaluated by the same procedures as above. The results reported in Table 4 confirm that the water-based treatment agent according to the present invention can reduce the adhesion and tack of fiber but at the same time can resist repetitive stretch/recovery cycling and is thus highly qualified for application as a lubricant.

TABLE 4

| silicone oil: silicone rubber powder mixing ratio | adhesion and tack | adhesion of lubricant after repetitive stretch/recovery cycling | overall evaluation |
|---|---|---|---|
| example of the invention | | | |
| 75:25 | adhesion and tack were completely absent | adhesion unchanged from original status | very good |
| comparative examples | | | |
| 100:0 | tendency for slight adhesion and tack to appear | adhesion unchanged from original status | unsatisfactory |
| 0:100 | no problems with adhesion or tack | powdery elastomer has debonded and adhered on the surface | unsatisfactory |
| blank (water) | substantial adhesion and tack were exhibited | — | — |

What is claimed is:

1. A method of deepening the color of fibers comprising applying from 0.1 to 8 weight percent of a water-based fiber treatment agent to the fibers, based on the weight of the fibers, (i) the fibers being selected from the group consisting of regenerated fibers, semi-synthetic fibers, synthetic fibers, raw yarn, mixed yarns, raw cotton, cotton wadding, fabrics, tows, knits, or weaves, (ii) the water-based fiber treatment agent containing (A) about 100 weight parts of a silicone oil, (B) about 5-200 weight parts of a silicone rubber powder having an average particle size of 0.1–500 $\mu$m, and (C) water, and (iii) the silicone rubber powder (B) being an aqueous dispersion of silicone rubber powder produced by addition curing, condensation curing, organoperoxide curing, or ultra-violet light curing of a silicone rubber composition while the silicone rubber composition is emulsified in water using an emulsifying agent.

2. A method according to claim 1 wherein the silicone oil (A) is an aminofunctional polyorganosiloxane oil.

* * * * *